UNITED STATES PATENT OFFICE.

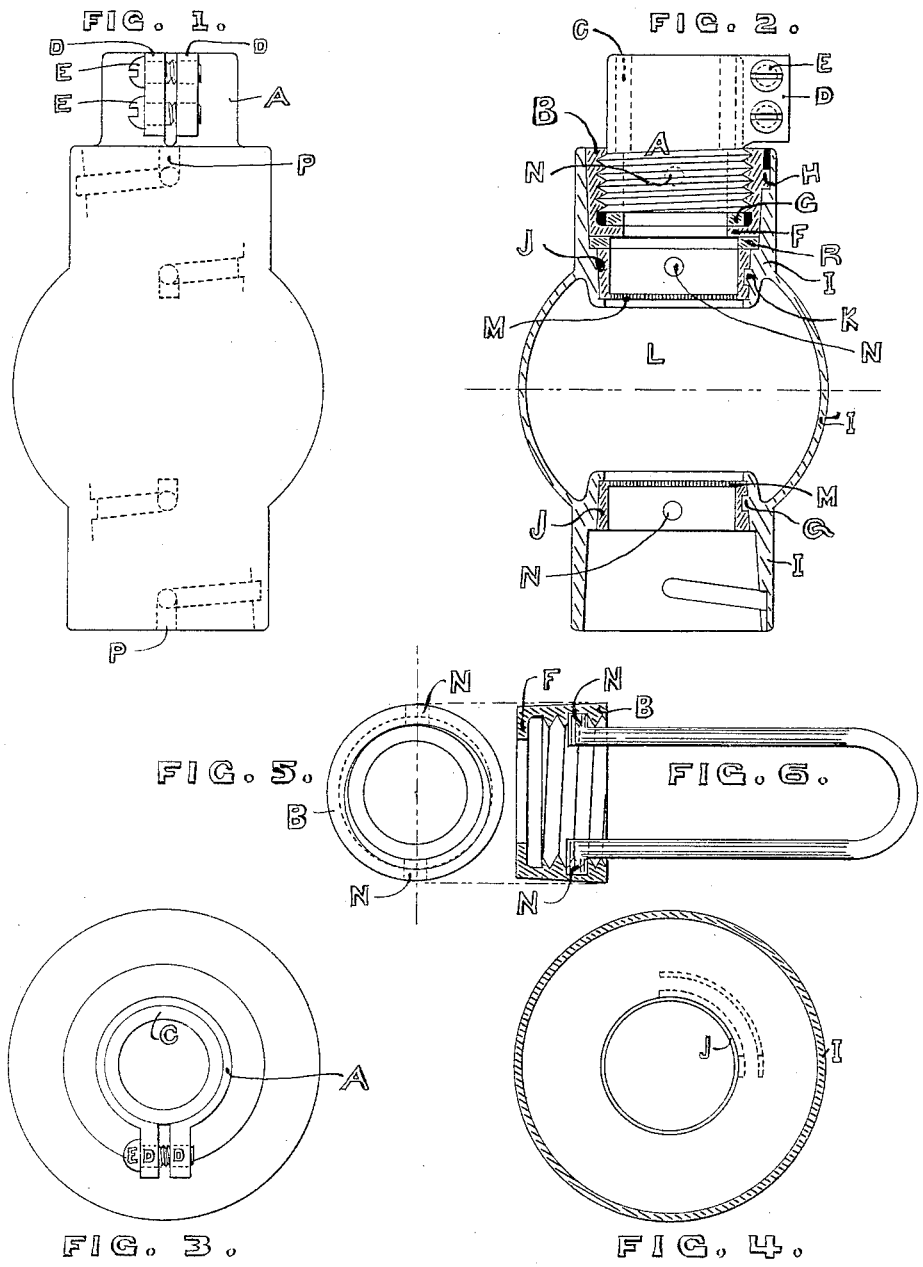

ALFRED J. GIBERSON, OF BOSTON, MASSACHUSETTS.

FILTER.

SPECIFICATION forming part of Letters Patent No. 318,465, dated May 26, 1885.

Application filed May 22, 1884. (No model.)

*To all whom it may concern:*

Be it known that I, ALFRED J. GIBERSON, of the city of Boston, county of Suffolk, and State of Massachusetts, have invented certain new and useful improvements in filters of the class which are made reversible for cleaning and are provided with facilities for easily and conveniently changing or renewing the material used for a filtering medium.

The nature of my invention relates to the construction and combination of parts, substantially as herein more fully described; and I do hereby declare that the following is a full and exact description thereof, reference being had to the accompanying drawings, and to the letters of reference marked thereon.

Like letters refer to the same or corresponding parts in all the figures.

Referring to the drawings, Figure 1 is an elevation of a filter. Fig. 2 is a corresponding sectional view. The plane of section is a vertical one coincident with the center line. Fig. 3 is a plan. Fig. 4 is a corresponding central section or sectional plan. Fig. 5 is a plan of the removable nut used to attach the filter-case to a screw-bib. Fig. 6 is a central section of the same, showing attached the detachable bail-like handle.

A is a screw-bib. It has a screw formed on one end to fit the removable nut B, which is of pipe-like construction, has a lining, C, of wood or rubber or other compressible material, and the two ears D D, with open space between, and the screws E, by means of which it may be clamped to a faucet or pipe. The nut B has a screw-thread internally to fit the screw-bib A, a rim or flange, F, to hold a washer, G, of leather or other material, and externally is of a round taper form, with a projecting lug or pin, H, on the round taper surface. This nut B is fitted to a corresponding round taper surface in the filter case or body I, in which is a vertical groove, P, as indicated by dotted lines in Fig. 1, to admit pin H, and an inclined groove, (also indicated,) and which is shown also in the lower end of filter-case, Fig. 2. These taper surfaces, pin, and grooves are for securing tightly and easily removing nut B. Both ends of the filter-case are alike fitted to receive and release the nut. A sleeve or ring, J, with like taper surface and upright and inclined grooves, is fitted to a corresponding internal taper surface in the filter-case, provided with a lug or pin, K, and is furnished with a wire-gauze or perforated retaining-plate for the filtering material. This also is fitted alike to each end of the filter-case, as see Fig. 2, and incloses the space L, which is filled with pulverized charcoal and granulated quartz or quartz broken fine, preferably with the body of fine charcoal in the middle and the quartz at the ends. The perforated plate or wire-gauze is marked M.

The nut B is provided with a bail-like handle similar to the bail of a bucket or pail. This bail is removable by springing the ends toward each other. It is inserted in the same way, and the recoil or springing apart keeps it in place in the sockets N made to receive it. The nut B can be inserted in either end of the filter-case.

The ring J is also provided for each end of the filter-case, and this ring is also provided with a removable handle like that for the nut and with like sockets to receive it.

The nut is inserted by placing its pin H in the vertical groove P and turning it round in the inclined groove till it is securely held, and is removed by a corresponding reversed movement. The ring J is inserted in like manner, its vertical groove receiving the pin Q while pushing it in, then the inclined groove acting on the pin as it is turned till securely held. I first insert one ring J and its plate or gauze M, then put in some quartz, then nearly fill with charcoal, complete with a layer of quartz, and then insert the other ring and gauze or plate. After thus charging the filter, the nut B is inserted in one end, and then the screw-bib A is screwed into the nut against the washer G.

A washer, R, may also be inserted between the nut and ring before the nut is inserted.

The screw-bib may be clamped by means of its screws E to any water-delivering pipe or faucet.

To reverse the filter for cleaning by the reversed flow of water, unscrew the nut from the screw-bib and screw the nut into the other end of the filter-case, and then screw the nut onto the bib again; or, when carefully fitted, the filter-case may be removed from the nut in the manner described, turning the case instead of the nut reversed, and its other end applied to the nut.

I claim—

1. The filter as constructed with the two taper-surfaced sockets for rings J, provided with the pins K, and the two taper-surfaced sockets for nut B, their inclined grooves and nut B, the rings J, provided with gauze or perforated plates M, and the screw-bib provided with the lining C, ears D, and screws E, substantially as described.

2. The gauze-supporting rings J, as constructed and fitted, with the described pin K or Q set in the described taper surface, and in combination with the correspondingly-fitted case, substantially as described.

3. In the construction of a filter, the nut B, when provided with the taper surface having the lug H, and fitted to a corresponding taper surface having the inclined groove in the filter-case, substantially as described.

4. In a filter, the clamp-bib as constructed with the exterior screw, interior packing-ring, the two ears D, and the slot extending between the ears to the screw, substantially as described.

5. The filter as constructed with nut B having the internal screw-thread, external taper surface, and lug and flange F, substantially as described.

6. The combined ring J and gauze or perforated plate provided with the external taper surface and inclined groove and bail-sockets and bail, in combination with the corresponding taper socket and lug in the filter-case, substantially as described.

7. A filter-case as constructed, with the taper sockets and a corresponding taper nut, pin, and inclined groove for adjustment to either end of the case, substantially as described.

8. A filter-case constructed with the taper sockets, the pin or lug, and inclined groove, correspondingly-fitted nut, and gauze-supporting rings, substantially as described.

ALFRED J. GIBERSON.

Witnesses:
DWIGHT CHESTER,
DAVID N. B. COFFIN.